A. R. SELDEN.
OPERATING DEVICE FOR CINEMATOGRAPHS.
APPLICATION FILED AUG. 4, 1916.
1,250,364.
Patented Dec. 18, 1917.
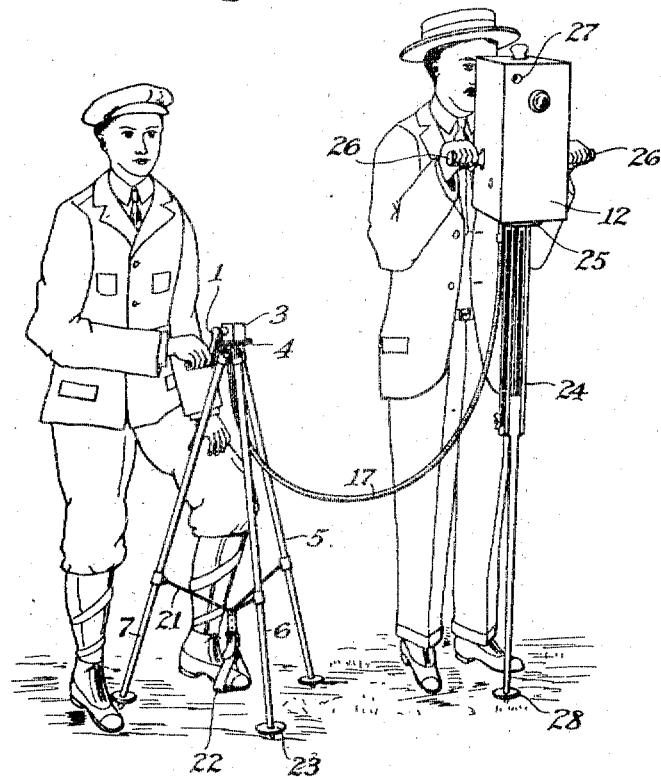
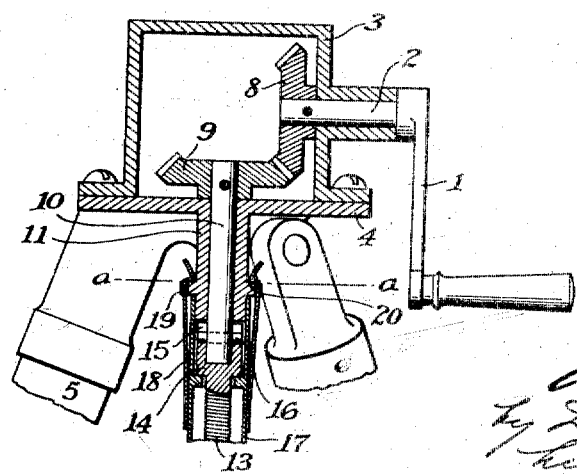
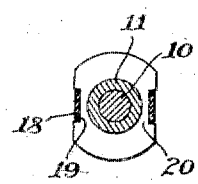
Inventor:
Arthur R. Selden
by Davis & Timms
his attorneys

UNITED STATES PATENT OFFICE.

ARTHUR R. SELDEN, OF ROCHESTER, NEW YORK.

OPERATING DEVICE FOR CINEMATOGRAPHS.

1,250,364.    Specification of Letters Patent.    Patented Dec. 18, 1917.

Application filed August 4, 1916. Serial No. 113,184.

*To all whom it may concern:*

Be it known that I, ARTHUR R. SELDEN, a citizen of the United States, and resident of Rochester, in the county of Monroe and State of New York, have invented certain new and useful Improvements in Operating Devices for Cinematographs, of which the following is a specification.

This invention relates to operating devices for cinematographs and this application contains matter divided from an application filed by me on March 20, 1916, Serial No. 85,297, one object of the invention being to provide a desirable means for actuating the mechanism of a cinematograph in such a manner that no jar or shock will be imparted to it, due to irregularities of movement in the manually operated driving crank. A further object of the invention is to provide means whereby the cinematograph may be manipulated in any desired direction by both hands of an operator, the driving mechanism being independent of the means by which the machine is directed.

To these and other ends, the invention consists in certain parts and combinations of parts all of which will be hereinafter described, the novel features being pointed out in the appended claims.

In the drawings:

Figure 1 is a perspective view showing a cinematograph equipped with this invention, and the manner in which it is operated;

Fig. 2 is a sectional elevation of the driving crank and its associated parts; and Fig. 3 is a section on the line *a—a*, of Fig. 2.

The means for driving the cinematograph comprises preferably an operating mechanism in the form of a crank 1 fixed to a shaft 2 that is rotatable in a housing 3. This housing is suitably attached to a head 4 that constitutes the connecting member between a set of legs 5, 6 and 7, the whole serving in the manner of a tripod as a support for the operating crank. In the present form of the device, the ferrule of the leg 5 is illustrated as integral with the head 4 so that this leg is rigid with the head, while the legs 6 and 7 are hinged to this plate in any well-known manner. The added rigidity of the tripod that is obtained by this construction is an important feature of the invention. On the end of the shaft 2, within the housing 3, is fixed a miter gear 8, that meshes with a similar gear 9 on a shaft 10. The latter extends through a bearing 11 that is part of the plate 4.

In order to drive the cinematograph 12 without vibration and without imparting to it the slight irregularities of the crank movement, a flexible connector is provided that is removably attached to the shaft 10 and is similarly attached to the main shaft of the cinematograph, in the manner shown in my pending application, Serial No. 85,297, filed March 20, 1916. The connector 13 is preferably provided with a head 14, having a terminal slot 15 that is adapted to engage an abutment on the shaft 10, such as a transverse pin 16. The connector is provided with the usual flexible sheath 17, which is readily attached to and detached from the bearing 11 by means of spring clips 18 that snap into notches 19, and thus hold the sheath against rotation, and by engaging the shoulders 20, maintain it in the required position. The flexible shaft yields in the direction of turning so as to prevent any sudden movements in the driving or operating member being transmitted to the cinematograph.

To further provide for rigidly supporting the crank 1 and its associated parts, cords 21 are fixed to the tripod legs 5, 6 and 7, and these cords are joined in an adjustable stirrup 22. The person operating the crank 1 may place one foot in this stirrup, and so may hold the tripod steady while turning the crank with one hand. The legs of the tripod may be provided with pads 23 near their lower ends, to prevent too deep entrance of the points into the ground or other surface on which the device may rest.

It is preferable, with the present form of the invention, to have one person operate the crank 1, and another manipulate the cinematograph 12, as indicated in Fig. 1.

In order that the cinematograph may be instantly and freely swung to any desired position and held as directed, a single support is provided for it such as an ordinary tripod leg 24 of the cinematograph 12 being preferably fixed on a plate 25 at the upper end of this leg, and provided on each side with a grip or handle 26. These handles are so located that the operator may grasp one in each hand, so as to readily swing the machine and the leg 24 about the bottom end of the latter, as a pivot, either backwardly and forwardly as well as from right to left, or in an arc of a circle, or a combination of both movements. Any movement of the cinematograph will not move the tripod or operating crank, and the flexible connector 13 will continue to drive the mechanism at the required speed as long as the second man turns the crank.

By reason of the operator having both hands available to direct the movement of the cinematograph, it is possible to exercise a very accurate control over it with little effort. The leg 24 may be constructed in any well known manner so as to be foldable, telescoping, or otherwise adjustable, in order to permit the operator to regulate the height of the apparatus so that the finder or sight aperture 27 will be on a level with his eye. A pad 28 on the leg 24 acts in a similar manner to the pads 23 and serves as a suitable pivoting base.

What I claim as my invention, and desire to secure by Letters Patent is:

1. In combination with a cinematograph having a suitable support, a stand adapted to rest upon the ground, separate from the cinematograph, an operating member mounted on the stand and driving connection between the operating member and the cinematograph embodying a flexible part.

2. In combination with a cinematograph having a suitable support, a stand adapted to rest upon the ground, separate from the cinematograph, an operating member mounted on the stand, and driving connection between the operating member and the cinematograph embodying a part yieldable in the direction of turning.

3. An operating device for cinematographs comprising a tripod, an operating handle mounted on the tripod, and a flexible shaft connected to the handle and having means adapting it for connection with a cinematograph.

4. In combination with a cinematograph, supporting means therefor permitting the cinematograph to swing freely both vertically and horizontally, a pair of hand pieces secured to opposite sides of said cinematograph by which the latter may be swung in the desired direction, and an operating member supported independently of the cinematograph and having driving connection with the latter.

5. An operating device for cinematographs comprising a tripod having one leg thereof rigid with the head and the other legs pivoted to the head, an operating handle mounted on the tripod, and means for connecting said handle with a cinematograph.

ARTHUR R. SELDEN.